United States Patent Office 2,919,182
Patented Dec. 29, 1959

2,919,182

METHOD OF CONTROLLING VEGETATION

Marion W. Harman, Nitro, and John J. D'Amico, Charleston, W. Va., assignors to Monsanto Chemical Company, St. Louis, Mo., a corporation of Delaware No Drawing. Application November 23, 1954
Serial No. 470,836

17 Claims. (Cl. 71—2.7)

This invention relates to methods of destroying or controlling vegetation and to herbicidal compositions. More particularly it relates to methods of destroying or controlling vegetation which comprises applying thereto a toxic concentration of a phytotoxic ester of a dithiocarbamic acid.

General objects of the invention are to provide compositions which are toxic to living plants and to provide methods for their use to accomplish various desirable ends. A further general object is to provide compositions and methods for the destruction of noxious vegetation. Another object is to provide defoliating compositions. Another object is to destroy noxious vegetation either in the form of germinating seeds or by application of the toxicant to the foliage after emergence. Still another object is to provide effective aquatic herbicides. A further object is to provide new compounds which are outstanding effective herbicides and to provide methods for preparing them. A particular object of the invention is to provide outstanding grass specific pre-emergence herbicides and methods for using them. A further particular object is to provide methods for the destruction or control of grasses by applying the toxicant to the foliage and to provide compositions for such purpose. Still another particular object is to provide methods for the destruction or control of broadleaved plants and to provide herbicidal compositions for such purpose. A further particular object is to provide compositions which not only are toxic to plants but destroy or control fungi. Other and further objects will be apparent from the detailed description which follows.

A method of destroying or controlling undesired vegetation, according to this invention, comprises applying thereto a toxic concentration of a phytotoxic ester of a dithiocarbamic acid. The phytotoxic esters of dithiocarbamic acids comprise weed killers having both pre-emergence and post-emergence activity. Accordingly, by applying the toxicant to the plant is meant any means whereby the toxicant is brought into contact with living plants which latter include germinating seedlings, as for example by application to the ground before the plants emerge or by direct application to the foliage. The dithiocarbamate herbicides are effective against a wide variety of plants including grasses and broadleaved plants. Some of them are outstanding grass specific pre-emergence herbicides. They also include defoliants. In general, the practical phytotoxic dithiocarbamates are new compounds of which the haloalkenyl esters are an outstanding example. The presence of a haloalkenyl ester group usually increased activity. Hydrocarbon alkyl and alkenyl esters exhibited greater structural specificity. Although a large number of dithiocarbamate esters were studied, delineation of herbicidal activity from structural consideration alone was not possible.

The discovery of compounds toxic to broadleaf plants but relatively innocuous to grasses has created considerable demand for compounds to destroy undesired grasses. It is therefore significant that dithiocarbamates were discovered which possess this property. Outstanding examples comprise 2-chloroallyl dimethyldithiocarbamate, 2-chloroallyl diethyldithiocarbamate, 3-chloroallyl diethyldithiocarbamate, 2-chloroallyl diallyldithiocarbamate, 3-chloroallyl diallyldithiocarbamate, 2-chloroallyl dibutyldithiocarbamate, 3-chloroallyl diisopropyldithiocarbamate, 2-chloroallyl diisopropyldithiocarbamate, 3-chloro-2-butenyl diisopropyldithiocarbamate, 3-chloro-2-butenyl dipropyldithiocarbamate, 2-chloroallyl dipropyldithiocarbamate, 2-bromoallyl diethyldithiocarbamate, 2-bromoallyl diisopropyldithiocarbamate, 2-chloroallyl-N-isopropyl-N-allyldithiocarbamate, allyl N-isopropyl-N-2-chloroallyldithiocarbamate, allyl diisopropyldithiocarbamate, allyl N-isopropyl-N-allyldithiocarbamate, allyl diallyldithiocarbamate, butyl diisopropyldithiocarbamate, propyl diisopropyldithiocarbamate, 2,3-dichloroallyl diethyldithiocarbamate and 2,3-dichloroallyl diisopropyldithiocarbamate.

The new toxicants may be applied conveniently in the form of a spray containing the active ingredient in a concentration within the range of 0.1%–10.0% by weight. Thorough coverage of the foliage is effective for contact killing. For pre-emergence control of grasses amounts within the range of ¼–60 pounds per acre have been used successfully. Examples of grasses which are controlled are foxtail, cheat grass, wild oats, rye grass and crab grass. Weeds from the following plant families are controlled to varying degrees: Leguminosae, Cucurbitaceae, Umbelliferae, Chenopodiaceae, Amaranthaceae, Convolvulaceae and Aizoaceae.

Although most esters of dithiocarbamic acids are insoluble in water, they are soluble in organic solvents. Most of them are soluble in acetone, chloroform, ethyl alcohol, ethyl acetate, benzene, ether and heptane. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents.

Tables I–VIII illustrate characteristic herbicidal activity of typical phytotoxic dithiocarbamates. The ester of a dithiocarbamic acid was emulsified in water and this emulsion was applied as a spray. In the foliage tests, the spray containing the concentration of active ingredient shown in the table was applied either to the foliage of bean and corn plants or to the foliage of a mixture of broadleaved plants and to the foliage of a mixture of grasses and the effect on the plants recorded. In the pre-emergence tests the spray was applied to the ground of seeded plots before any grass or other plants emerged. The amount of dithiocarbamate applied in pounds per acre is recorded together with the phytotoxicity observed. In many instances no grass at all survived to emerge although the untreated controls were glutted with grass. Tables I and II summarize typical results with haloalkenyl dithiocarbamates. In these compounds, presence of hydrogen on the nitrogen decreased the pre-emergent activity without affecting the contact activity. For example, 2-chloroallyl dithiocarbamate and 3-chloro-2-butenyl dithiocarbamate were strongly phytotoxic on contact with foliage but weakly phytotoxic in pre-emergence application.

In addition, the properties of 2,3-dichloroallyl esters of diethyl- and diisopropyldithiocarbamic acids were outstanding. In both instances the mixture of the cis and trans isomers was used. These esters were outstanding grass specific herbicides at rates of one-half pound per

Table I

| Compound | Conc., percent | Phytotoxicity Bean | Phytotoxicity Corn |
| --- | --- | --- | --- |
| 3-chloro-2-butenyl dimethyl-dithiocarbamate | 1.0 | Plant dead, leaves dried and dropped | Plant dead, leaves dried. |
|  | 0.3 | Severe | Do. |
| 2-chloroallyl dimethyl-dithiocarbamate | 1.0 | ----do [1] | Severe.[2] |
| 2-chloroallyl dithiocarbamate | 1.0 | ----do | Do. |
| 3-chloro-2-butenyl dithiocarbamate | 1.0 | ----do | Do. |
|  | 1.0 | Plant, dead leaves dried and dropped | Plant dead, leaves dried. |
| 2-chloroallyl diethyl-dithiocarbamate | 1.0 | Moderate | Plant dead, leaves dried. |
| 3-chloro-2-butenyl diethyl-dithiocarbamate | 1.0 | Severe | Plant dead. |
|  | 0.3 | Moderate | Moderate. |
| 3-chloroallyl diethyl-dithiocarbamate | 1.0 | Plant dead, leaves dried | Plant dead, leaves dried. |
|  | 0.3 | Moderate | Severe. |
| 3-chloroallyl dimethyl-dithiocarbamate | 1.0 | Plant dead | Moderate. |
|  | 0.3 | Severe | Severe. |
| 3-chloroallyl 4-morpholine-carbodithioate | 1.0 | Plant dead, leaves dried | Plant dead, leaves dried. |
| 2-chloroallyl diallyl-dithiocarbamate | 1.0 | Moderate | Severe. |
|  | 0.3 | Slight | Moderate. |
| Bis(2-chloroallyl)-2,5-dimethyl-1,4-piperazine dicarbodithioate | 1.0 | None | Do. |
|  | 0.3 | ----do | Do. |
| 3-chloro-2-butenyl diallyl-dithiocarbamate | 1.0 | Moderate | Severe, leaves dried. |
|  | 0.3 | Slight | Moderate. |
| Bis(3-chloro-2-butenyl)-2-5,dimethyl-1,4-piperazine dicarbodithioate | 1.0 | Severe [1] | Severe.[2] |
|  | 1.0 | Slight | Do. |
| 3-chloroallyl diallyl-dithiocarbamate | 1.0 | Severe [1] | Do.[2] |
| 3-chloro-2,4-hexadienyl dimethyldithiocarbamate | 1.0 | Moderate | Slight. |
| 3-chloro-2-butenyl isopropyl-dithiocarbamate | 1.0 | Moderate [1] leaves defoliated | Do.[2] |

[1] Tested against beans and other broadleaved plants.
[2] Tested against a mixture of grasses.

Table II

| Compound | Rate Applied, Lbs./Acre | Results Observed |
| --- | --- | --- |
| 3-chloro-2-butenyldimethyldithiocarbamate | 25 | Moderate phytotoxicity to cheat grass and red clover. |
| 2-chloroallyl dimethyl-dithiocarbamate | 20 | Severe injury beet and radish; moderate injury rye grass. |
|  | 5 | Severe phytotoxicity to cheat grass and rye; moderate injury to wild oat, beet and cucumber. |
|  | 25 | Severe injury wild oat, cheat grass, rye and cucumber. |
|  | 12 | Average 90% weed control. Severe injury carrot, cucumber, sugar beet, wild oat; moderate injury cotton, soyabean, turnip, bush bean, buckwheat, wheat, alfalfa, lettuce, flax and morning glory; slight injury onions and no injury corn or radishes. |
| 2-chloroallyl diethyl-dithiocarbamate | 10 | Severe injury wild oat, cheat grass and rye. |
|  | 5 | Severe phytotoxicity to wild oat, cheat grass and rye; slight injury onions, cotton, cucumber, sugar beet, turnip, buckwheat and wheat; no injury soyabean, bush bean, alfalfa, corn, lettuce, flax, morning glory and radishes. |
|  | 25 | Severe phytotoxicity to wild oat, rye and cheat grass. |
| 3-chloroallyl diethyl-dithiocarbamate | 12 | Severe phytotoxicity to soyabean and oats; moderate injury to wheat and peanuts. |
|  | 5 | Severe phytotoxicity to rye; moderate action on cheat grass. |
| 3-chloroallyl dimethyl-dithiocarbamate | 25 | Severe injury to cheat grass. |
| 2-chloroallyl diallyl-dithiocarbamate | 25 | Grasses almost completely inhibited whereas all broadleaves normal. A grass specific. |
|  | 5 | Severe injury wild oats and rye. |
| 3-chloroallyl diallyl-dithiocarbamate | 5 | Severe phytotoxicity to wild oats, cheat grass and rye; moderate injury to red clover and beets. |
| 3-chloro-2,4-hexadienyl dimethyl-dithiocarbamate | 40 | Moderate injury cheat grass and beet. |
| Bis(3-chloro-2-butenyl)-2,5-dimethyl-1,4-piperazine dicarbodithioate. | 25 | Moderate injury rye and red clover; slight injury wild oat, beet and cucumber; no injury cheat grass, buckwheat, mustard or cotton. |
| 3-chloro-2-butenyl isopropyl-dithiocarbamate | 25 | Severe injury red clover; slight injury rye and mustard; no injury wild oat, cheat grass, buckwheat, beet, cotton or cucumber. |
| 3-chloro-2-butenyl diisopropyl dithiocarbamate | 25 | Completely inhibited germination of wild oats and rye grass with little or no action on buckwheat, radish, clover, beet, cotton, cucumber and cheat grass. |
| 3-chloroallyl N-(β-cyano-ethyl)-N-isopropyl-dithiocarbamate. | 25 | Severely toxic to rye grass, other plants uninjured. | acre. The presence of a chloroalkenyl group on both the nitrogen and sulfur usually reduced the activity but N-2-chloroallyl N-isopropyldithiocarbamic acid was exceptional. Moreover, some of the alkenyl and alkyl esters of N-chloroalkenyl dithiocarbamates were outstanding. Tables III and IV illustrate the contact and pre-emergence phytotoxicity of dithiocarbamate esters containing a chloroalkenyl group attached to nitrogen.

Table III

| Compound | Foliage contact conc., percent | Phytotoxicity | |
|---|---|---|---|
| | | Grasses | Broadleaves |
| 2-chloroallyl N-(2-chloroallyl)-isopropyl-dithiocarbamate. | 1.0 | Moderate to severe. | Moderate to severe. |
| 3-chloroallyl N-(2-chloroallyl)-isopropyl-dithiocarbamate. | 1.0 | do | Do. |
| 2-propynyl N-(2-chloroallyl)-isopropyl-dithiocarbamate. | 1.0 | Moderate. | Moderate. |
| Allyl N-(2-chloroallyl)-isopropyl-dithiocarbamate. | 1.0 | Moderate to severe. | Moderate to severe. |
| Butyl N-(2-chloroallyl)-isopropyl-dithiocarbamate. | 1.0 | Severe. | Moderate. |
| 2-chloroallyl diisobutyl-dithiocarbamate. | 1.0 | Moderate to severe. | Moderate to severe. |
| Allyl N-(2-chloroallyl)-3-methoxypropyl-dithiocarbamate. | 1.0 | Slight to moderate. | Do. |

Table IV

| Compound | Pre-emergence applications | |
|---|---|---|
| | Rate applied, lbs./acre | Results observed |
| 2-chloroallyl N-(2-chloroallyl)-isopropyl-dithiocarbamate. | 25 | Grasses badly stunted |
| 3-chloroallyl N-(2-chloroallyl)-isopropyl-dithiocarbamate. | 25 | Do. |
| 2-propynyl N-(2-chloroallyl)-isopropyl-dithiocarbamate. | 25 | Moderate injury to rye grass. |
| Allyl N-(2-chloroallyl)-isopropyl-dithiocarbamate. | 25 | Grasses badly stunted. |
| Butyl N-(2-chloroallyl)-isopropyl-dithiocarbamate. | 25 | Do. |
| 2-chloroallyl diisobutyl-dithiocarbamate. | 25 | Do. |
| Allyl N-(2-chloroallyl)-3-methoxypropyl-dithiocarbamate. | 25 | Grasses stunted. |

Allyl N-(2-chloroallyl)isopropyldithiocarbamate is a very active compound and controlled grasses at 5 pounds per acre.

Examples of small structural changes which alter the herbicidal properties remarkably are prevalent among alkenyl and alkyl esters of dialkyl dithiocarbamic acids. For example, allyl diisopropyldithiocarbamate destroyed grasses pre-emergence at 5 pounds per acre and most grasses at 1 pound per acre. However, allyl dimethyldithiocarbamate was not in the same class. Allyl diallyldithiocarbamate destroyed all grasses pre-emergence at 5 pounds per acre and the allyl ester of N-allyl N-isopropyldithiocarbamate was also a very active compound. Tables V and VI illustrate the herbicidal properties of some typical alkenyl esters of dithiocarbamic acids.

Table V

| Compound | Foliage contact conc., percent | Phytotoxicity | |
|---|---|---|---|
| | | Grasses | Broadleaves |
| Allyl diethyl-dithiocarbamate | 0.3 | Severe | Slight. |
| 2-butene-1,4-dithiol bis(diethyl-dithiocarbamate). | 1.0 | do | Do. |
| Allyl diisopropyl-dithiocarbamate | 1.0 | Moderate. | Do. |

Table VI

| Compound | Pre-emergence applications | |
|---|---|---|
| | Rate applied, lbs./acre | Results observed |
| Allyl diethyl-dithiocarbamate | 5 | Severe action on grasses. |
| 2-butene-1,4-dithiol bis(diethyl-dithiocarbamate). | 60 | Severe action on broadleaves. |
| Allyl diisopropyl-dithiocarbamate | 5 | Severe action on grasses and all broadleaves stunted. |
| Allyl diallyl-dithiocarbamate | 5 | All grasses destroyed. |
| Allyl dibutyl-dithiocarbamate | 10 | Do. |

Propyl and butyl diisopropyldithiocarbamates were exceedingly effective pre-emergence herbicides. They controlled all grasses at two and one-half pounds per acre and were severely phytotoxic to most grasses at one pound per acre. On the other hand, methyl diisopropyldithiocarbamate was less effective. Ethyl dimethyldithiocarbamate was not active enough to be practical. Table VII summarizes some typical observations on alkyl dithiocarbamates.

Table VII

| Compound | Pre-emergence applications | |
|---|---|---|
| | Rate applied, lbs./acre | Phytotoxicity |
| Butyldi isopropyl-dithiocarbamate. | 5 | Severe to grasses, none to broadleaves. |
| Propyl diisopropyl-dithiocarbamate. | 5 | Do. |
| Isopropyl diisopropyl-dithiocarbamate. | 25 | Do. |
| Ethyl diisopropyl-dithiocarbamate. | 10 | Do. |
| Methyl diisopropyl-dithiocarbamate. | 25 | Do. |
| Methyl diethyl-dithiocarbamate. | 25 | Moderate to grasses, none to broadleaves. |
| Ethyl diethyl-dithiocarbamate. | 25 | Severe to grasses, none to broadleaves. |

More extensive testing on larger areas and under varying conditions of soil, weather and concentrations of the active ingredient confirmed that the new herbicides were outstandingly effective. For example, field tests with 2-chloroallyl diethyldithiocarbamate showed that it was an outstanding weed killer having both contact and pre-emergence activity. This compound was particularly useful for grass control. In pre-emergence application it completely suppressed grass emergence at rates of application down to 10 pounds per acre. At this concentration it was moderately toxic to red clover and cucumber but relatively non-toxic to cotton, beet, radish and buckwheat. Furthermore, the compound was fungistatic at dilutions of 1 to 10,000. There has been much demand for a herbicide exerting a surface fungistatic action against "damping off." The herbicidal properties of 3-chloroallyl diethyldithiocarbamate closely resemble those of the 2-chloroallyl isomer, the former being slightly less phytotoxic.

Another outstanding grass specific pre-emergence herbicide was 2-chloroallyl dimethyldithiocarbamate. Grass control was exhibited at applications as low as 1 pound per acre. An important use, for example, was in the control of cheat grass in wheat. Pre-emergence application of 2-chloroallyl diallyldithiocarbamate at the rate of 25 pounds per acre almost completely inhibited all grasses whereas all the broadleaf plants appeared normal and healthy. It was effective for controlling grasses in sugar beets and cotton at 5 or 10 pounds per acre. Still another compound which exhibited outstanding pre-emergence phytotoxicity was 3-chloroallyl diallyldithiocarbamate. It was slightly more phytotoxic than 2-chloroallyl diallyldithiocarbamate and 2-chloroallyl diethyldithiocarbamate.

As ilustrative of the use as defoliants, an aqueous spray containing 1% by weight of 3-chloroallyl dimethyldithiocarbamate was applied to bean foliage with the result that the plants were defoliated. Similarly, terminal abscission was observed after application of a spray containing 1% by weight of 3-chloro-2-butenyl dithiocarbamate. Further tests confirmed that the compound possessed defoliating properties.

The problem of controlling aquatic plants as for example, in irrigation ditches, is particularly troublesome. Since there is no ready means of concentrating the toxicant on the plants, the only convenient method of application being incorporation into the water, it is generally uneconomical to build up a lethal concentration. For example, a 1% solution based on the total irrigation water would be prohibitive in cost. However, the toxicants of this invention have been observed to possess phytotoxicity against aquatic plants at concentrations as low as 1 part per million. Examples of particularly active aquatic herbicides are 3-chloroallyl dimethyldithiocarbamate and 2-chloroallyl diallyldithiocarbamate. Addition of these componnds to the water at a concentration of 5 p.p.m destroyed aquatic plant life. Another important observation was that the latter was toxic to snails at a concentration of 1 p.p.m. but was not toxic to fish.

Mention has been made of the valuable surface fungistatic action against "damping off" organisms possessed by 2-chloroallyl diethyldithiocarbamate and 3-chloroallyl diethyldithiocarbamate. Other compounds observed to exert a fungistatic action against "damping off" organisms, notably Pythium, were 3-chloro-2-butenyl dimethyldithiocarbamate, 3-chloroallyl dimethyldithiocarbamate and 3-chloroallyl 4-morpholinecarbodithioate. Activity against other fungi was also observed. 3-chloro-2-butenyl diethyldithiocarbamate was active in Monilinia germination tests and 3-chloro-2-butenyl-4-morpholinecarbodithioate was active against Sclerotinia.

Esters of dithiocarbamic acids were readily prepared by condensing a salt of a dithiocarbamic acid with a halide containing the desired ester forming radical. For example, chloroalkenyl esters were prepared by condensing an alkali metal salt of a dithiocarbamic acid with a polyhaloolefin under such conditions that part only of the halogen was removed. Suitable substituted olefins comprise cis-1,2,3-trichloro-2-butene, trans-1,2,3-trichloro-2-butene, 1,3-dichloro-2-butene, 2,3-dichloro-1-propene, 2,3-dibromo-1-propene, 1,3-dichloropropene, 1-chloro-3-iodo-2-propene, 1,3-diiodo-2-butene, 2,3-diiodo-2-butene, 1-bromo-2,3-diiodo-2-butene, 3-bromo-1-chloro-2-fluoro-1-propene, cis-1,2,3-trichloro-1-propene, trans-1,2,3-trichloro-1-propene, 1,4-dibromo-2,3-dichloro-2-butene and 2,3,3-trichloro-1-butene. The last readily undergoes an allylic rearrangement and is therefore equivalent to 1,2,3-trichloro-2-butene. The following illustrate in detail typical methods of preparation:

125 grams (1 molecular proportion) of 1,3-dichloro-2-butene was added with stirring to 840 grams (1 molecular proportion) of a 17% solution of sodium dimethyldithiocarbamate containing a few drops of a 30% solution of a surface active agent (dodecylbenzene sodium sulfonate). Within 20 minutes a temperature rise from 30 to 46° C. was noted. The mixture was heated at 50–60° C. for 4 hours. After cooling to room temperature the layers were separated, the organic layer washed with warm water until the wash water was neutral to litmus, dried over sodium sulfate, and finally any unreacted 1,3-dichloro-2-butene was removed in vacuo at room temperature. 183 parts by weight, M.P. 27–28° C., was obtained. The product could not be distilled at 1 mm. without decomposition. Analysis gave 6.90% nitrogen, 30.60% sulfur and 17.00% chlorine as compared to 6.68% nitrogen, 30.57% sulfur and 16.90% chlorine calculated for $C_7H_{12}ClNS_2$.

398 grams (3.58 moles) of 2,3-dichloro-1-propene was added dropwise with stirring to 890 grams (15.0 moles) of monoisopropylamine and 380 grams of water over a period of three to five hours at a temperature of 47° C. The stirred reaction mixture was then heated at 60–70° C. for four hours. On cooling to 25° C., 200 grams (5.0 moles) of flake caustic was added to the reaction mixture and stirring continued for twenty minutes. After filtration the organic layer was separated and dried over sodium hydroxide and the excess isopropylamine removed by distillation at 760 mm. pressure. The product, a colorless liquid $n_D^{25}=1.4430$, was collected at 138–140° C. To a stirred solution comprising 33.4 grams (0.25 mole) of the 2-chloro-N-isopropylallylamine so obtained, 40.0 grams (0.25 mole) of 25% sodium hydroxide and 500 ml. of water was added 19 grams (0.25 mole) of carbon disulfide at 25–30° C. and the mixture stirred for two hours. Next was added 19.2 grams (0.25 mole) of allyl chloride and the reaction mixture heated at 50–60° C. for five hours. After cooling to room temperature the reaction mixture was extracted with ethyl ether, the ether solution washed with water until neutral to litmus, dried over sodium sulfate and the ether removed in vacuo. The allyl N-(2-chloroallyl)isopropyldithiocarbamate, an amber oil, was obtained in 78.5% theory yield. Analysis gave 5.42% nitrogen, 25.87% sulfur and 14.05% chlorine as compared to 5.61% nitrogen, 25.67% sulfur and 14.19% chlorine calculated for $C_{10}H_{16}ClNS_2$.

19.2 grams (0.25 mole) of allyl chloride was added with stirring to 209 grams (0.25 mole) of a 23.6% solution of sodium isopropylallyldithiocarbamate. Within 10 minutes a temperature rise from 20 to 34° C. was noted. The reaction mixture was stirred for five hours and extracted with 150 ml. of benzene. The benzene layer was washed with water until neutral to litmus, dried over sodium sulfate and the benzene removed in vacuo. The allyl N-(allyl)isopropyldithiocarbamate, an amber oil, was obtained in 85.5% theory yield. Analysis gave 6.81% nitrogen as compared to 6.50% calculated for $C_{10}H_{17}NS_2$.

60 grams (0.783 mole) of allyl chloride was added with stirring to 917 grams (0.783 mole) of a 17% aqueous solution of sodium diisopropyldithiocarbamate. An exothermic reaction set in causing the temperature to rise from 28 to 53° C. in 10 minutes. The reaction mixture was heated at 50–60° C. for 3 hours, cooled to room temperature and extracted with 500 ml. of ethyl ether. The ether extract was washed with water until the washings were neutral to litmus, dried over sodium sulfate and the ether removed in vacuo. The allyl diisopropyldithiocarbamate, an amber oil, was obtained in 68.4% theory yield. Analysis gave 6.65% nitrogen and 29.33% sulfur as compared to 6.44% nitrogen and 29.50% sulfur calculated for $C_{10}H_{19}NS_2$.

76 grams (1.0 mole) of carbon disulfide was added dropwise over a 15 minute period with stirring to a solution comprising 97.2 grams (1.0 mole) of diallylamine, 160 grams (1.0 mole) of 25% sodium hydroxide and 1,000 ml. of water. The reaction mixture was stirred for an additional hour and then 76.5 grams (1.0 mole) of allyl chloride added in one portion. The stirred reaction mixture was heated at 50–60° C. for three hours and then cooled to 20° C. The reaction mixture was extracted with 500 ml. of ethyl ether, the ether extract washed with water until the washings were neutral to litmus, dried over sodium sulfate and the ether removed in vacuo. The allyl diallyldithiocarbamate, an amber oil, was obtained in 76% theory yield. Analysis gave 6.50% nitrogen and 30.00% sulfur as compared to 6.56% nitrogen and 30.06% sulfur calculated for $C_{10}H_{15}NS_2$.

76 grams (1.0 mole) of carbon disulfide was added dropwise over a 15 minute period with stirring to a solution comprising 129.2 grams (1.0 mole) of dibutylamine, 160 grams (1.0 mole) of 25% sodium hydroxide and 1,000 grams of water. The reaction mixture was stirred for an additional hour and then 76.5 grams (1.0 mole) of allyl chloride added in one portion. The stirred reaction mixture was heated at 50–60° C. for three hours and then cooled to 20° C. The reaction mixture was extracted with 500 ml. of ethyl ether, the ether extract washed with water until the washings were neutral to litmus, dried over sodium sulfate and the ether removed in vacuo. The allyl dibutyldithiocarbamate, an amber oil, was obtained in 87.7% theory yield. Analysis gave 5.80% nitrogen and 26.02% sulfur as compared to 5.71% nitrogen and 26.13% sulfur calculated for $C_{12}H_{23}NS_2$.

The structures of examples of phytotoxic esters are summarized in Table VIII. All of these compounds were studied by the methods hereinabove described and found to be phytotoxic. The esters of di-β-hydroxyethyldithiocarbamic acid were similar to the esters of unsubstituted dithiocarbamic acid in that they exerted contact action but weak pre-emergence activity. It is of interest that 2-chloroallyl dioctyldithiocarbamate was a contact herbicide although in progressing from esters of dipropyl to esters of dibutyl and diamyl dithiocarbamic acid the activity was observed to decrease.

*Table VIII*

| Structural formula | Compound | Physical Properties |
|---|---|---|
| $(CH_3)_2NCSSCH_2CH=CClCH_3$ | 3-cloro-2-butenyl dimethyldithiocarbamate. | Amber solid, M.P. 27-28° C. |
| $(CH_3)_2NCSSCH_2CCl=CH_2$ | 2-chloroallyl dimethyldithiocarbamate. | Amber solid, M.P. 35-36.5° C. |
| $NH_2CSSCH_2CCl=CH_2$ | 2-chloroallyl dithiocarbamate. | Tan solid, M.P. 30-33° C. |
| $NH_2CSSCH_2CH=CClCH_3$ | 3-chloro-2-butenyl dithiocarbamate. | Semi-solid, M.P. 25-27° C. |
| $(C_2H_5)_2NCSSCH_2CCl=CH_2$ | 2-chloroallyl diethyldithiocarbamate. | Amber liquid. |
| $(C_2H_5)_2NCSSCH_2CH=CClCH_3$ | 3-chloro-2-butenyl diethyldithiocarbamate. | Liquid. |
| $(C_2H_5)_2NCSSCH_2CH=CHCl$ | 3-chloroallyl diethyldithiocarbamate. | Do. |
| $(CH_3)_2NCSSCH_2CH=CHCl$ | 3-chloroallyl dimethyldithiocarbamate. | Do. |
| Morpholine-CSSCH$_2$CCl=CH$_2$ | 3-chloro-2-butenyl-4-morpholinecarbodithioate | White solid, M.P. 56-57° C. |
|  | 2-chloroallyl-4-morpholinecarbodithioate. | Light cream solid, M.P. 73-74° C. |
| Morpholine-CSSCH$_2$CH=CHCl | 3-chloroallyl 4-morpholinecarbodithioate. | Amber liquid, below −10° C. |
| $(CH_2=CHCH_2)_2NCSSCH_2CCl=CH_2$ | 2-chloroallyl diallyldithiocarbamate. | Amber liquid. |
| Piperazine bis-CSSCH$_2$CCl=CH$_2$ | Bis(2-chloroallyl)-2,5-dimethyl-1,4-piperazine dicarbodithioate. | Light yellow solid, M.P. 124-125° C. |
| $(CH_2=CHCH_2)_2NCSSCH_2CH=CClCH_3$ | 3-chloro-2-butenyl diallyldithiocarbamate. | Amber liquid. |
| Piperazine bis-CSSCH$_2$CH=CClCH$_3$ | Bis(3-chloro-2-butenyl)-2,5-dimethyl-1,4-piperazinedicarbodithioate. | Light yellow solid, M.P. 102-103° C. |
| $(CH_3)_2NCSSCH_2CH=CClCH=CHCH_3$ | 3-chloro-2,4-hexadienyl dimethyldithiocarbamate. | Amber oil. |
| $(HOCH_2CH_2)_2NCSSCH_2CH=CClCH_3$ | 3-chloro-2-butenyl bis(2-hydroxyethyl)dithiocarbamate. | Do. |
| $(HOCH_2CH_2)_2NCSSCH_2CCl=CH_2$ | 2-chloroallyl bis(2-hydroxyethyl)dithiocarbamate. | Do. |
| $(HOCH_2CH_2)_2NCSSCH_2CH=CHCl$ | 3-chloroallyl bis(2-hydroxyethyl)dithiocarbamate. | Do. |
| $(CH_2=CHCH_2)_2NCSSCH_2CH=CHCl$ | 3-chloroallyl diallyldithiocarbamate. | Amber liquid. |
| $NCC_2H_4N(CH_3)CSSCH_2CH=CClCH_3$ (ethylene-bridged dimer) | N,N'-ethylenebis(3-chloro-2-butenyl β-cyanoethyldithiocarbamate). | Colorless solid, M.P. 138-140° C. |
| $(C_4H_9)_2NCSSCH_2CCl=CH_2$ | 2-chloroallyl dibutyldithiocarbamate. | Amber oil. |
| $(C_4H_9)_2NCSSCH_2CH=CHCl$ | 3-chloroallyl dibutyldithiocarbamate. | Amber liquid. |
| $[(CH_3)_2CH]_2NCSSCH_2CH=CHCl$ | 3-chloroallyl diisopropyldithiocarbamate. | Do. |
| $[(CH_3)_2CH]_2NCSSCH_2CCl=CH_2$ | 2-chloroallyl diisopropyldithiocarbamate. | Amber oil. |
| $[(CH_3)_2CH]_2NCSSCH_2CH=CClCH_3$ | 3-chloro-2-butenyl diisopropyldithiocarbamate. | Do. |
| $(CH_3)_2CH-N(CNCH_2CH_2)CSSCH_2CH=CHCl$ | 3-chloroallyl N-(β-cyanoethyl)-N-isopropyldithiocarbamate. | Pale yellow solid, M.P. 54-57° C. |
| $(CH_3CH_2CH_2)_2NCSSCH_2CH=CClCH_3$ | 3-chloro-2-butenyl dipropyldithiocarbamate. | Amber oil. |
| $(CH_3CH_2CH_2)_2NCSSCH_2CCl=CH_2$ | 2-chloroallyl dipropyldithiocarbamate. | Do. |

Table VIII—Continued

| Structural formula | Compound | Physical Properties |
|---|---|---|
| CH$_2$=CHCH$_2$\\NCSSCH$_2$CCl=CH$_2$ / (CH$_3$)$_2$CH | 2-chloroallyl N-(allyl)isopropyldithiocarbamate. | Pale yellow oil. |
| CH$_2$=CHCH$_2$\\NCSSCH$_2$CH=CClCH$_3$ / (CH$_3$)$_2$CH | 3-chloro-2-butenyl N-(allyl)isopropyldithiocarbamate. | Pale amber oil. |
| (C$_8$H$_{17}$)$_2$NCSSCH$_2$CCl=CH$_2$ | 2-chloroallyl dioctyldithiocarbamate | Amber liquid. |
| (CH$_3$)$_2$CHNCSSCH$_2$CCl=CH$_2$ / CH$_2$CCl=CH$_2$ | 2-chloroallyl N-(2-chloroallyl) isopropyldithiocarbamate. | Do. |
| (CH$_3$)$_2$CHNCSSCH$_2$CH=CHCl / CH$_2$CCl=CH$_2$ | 3-chloroallyl N-(2-chloroallyl)isopropyldithiocarbamate. | Amber oil. |
| [(CH$_3$)$_2$CHCH$_2$]$_2$NCSSCH$_2$CCl=CH$_2$ | 2-chloroallyl diisobutyldithiocarbamate. | Do. |
| CH$_2$—CH$_2$\\NCSSCH$_2$CH=CHCl / CH$_2$—CH$_2$ | 3-chloroallyl-1-pyrrolidinecarbodithioate. | Do. |
| CH$_2$—CH$_2$\\NCSSCH$_2$CCl=CH$_2$ / CH$_2$—CH$_2$ | 2-chloroallyl-1-pyrrolidinecarbodithioate. | Tan solid, M.P. 45–46° C. |
| CH$_2$—CH$_2$\\NCSSCH$_2$CH=CClCH$_3$ / CH$_2$—CH$_2$ | 3-chloro-2-butenyl-1-pyrrolidinecarbodithioate. | Amber oil. |
| (C$_2$H$_5$)$_2$NCSSCH$_2$CCl=CHCl | Cis- and trans-2,3-dichloroallyl diethyldithiocarbamate. | Dark amber liquid. |
| [(CH$_3$)$_2$CH]$_2$NCSSCH$_2$CCl=CHCl | Cis- and trans-2,3-dichloroallyl diisopropyldithiocarbamate. | Do. |
| (CH$_2$=CHCH$_2$)$_2$NCSSCH$_2$CCl=CHCl | Cis- and trans-2,3-dichloroallyl diallyldithiocarbamate. | Do. |
| (C$_2$H$_5$)$_2$NCSSCH$_2$CBr=CH$_2$ | 2-bromoallyl diethyldithiocarbamate | Amber liquid. |
| [(CH$_3$)$_2$CH]$_2$NCSSCH$_2$CBr=CH$_2$ | 2-bromoallyl diisopropyldithiocarbamate. | Do. |
| (CH$_2$=CHCH$_2$)$_2$NCSSCH$_2$CBr=CH2 | 2-bromoallyl diallyldithiocarbamate | Amber oil. |
| (CH$_3$)$_2$CHNCSSCH$_2$CBr=CH$_2$ / CH$_2$CCl=CH$_2$ | 2-bromoallyl N-(2-chloroallyl)isopropyldithiocarbamate. | Do. |
| (CH$_2$=CClCH$_2$)$_2$NCSSCH$_2$CCl=CH$_2$ | 2-chloroallyl bis-(2-chloroallyl)dithiocarbamate. | Do. |
| (CH$_2$=CClCH$_2$)$_2$NCSSCH$_2$CH=CH$_2$ | Allyl bis (2-chloroallyl)dithiocarbamate. | Do. |
| (CH$_2$=CClCH$_2$)$_2$NCSSCH$_2$CH=CHCH$_2$SSCN(CH$_2$CCl=CH$_2$)$_2$ | 2-butene-1,4-dithiol bis[di(2-chloroallyl)-dithiocarbamate]. | Viscous amber oil. |
| (CH$_3$)$_2$CHNCSSCH$_2$C≡CH / CH$_2$CCl=CH$_2$ | 2-propynyl N-(2-chloroallyl)isopropyldithiocarbamate. | Amber liquid. |
| (CH$_3$)$_2$CHNCSSCH$_2$CH=CH$_2$ / CH$_2$CCl=CH$_2$ | Allyl N-(2-chloroallyl)isopropyldithiocarbamate. | Amber oil. |
| (CH$_3$)$_2$CHNCSSC$_4$H$_9$ / CH$_2$CCl=CH$_2$ | Butyl N-(2-chloroallyl)isopropyldithiocarbamate. | Do. |
| CH$_3$OCH$_2$CH$_2$CH$_2$NCSSCH$_2$CH=CH$_2$ / CH$_2$CCl=CH$_2$ | Allyl N-(2-chloroallyl)-3-methoxypropyldithiocarbamate. | Do. |
| CH$_2$—CH$_2$\\NCSSCH$_2$C≡CH / CH$_2$—CH$_2$ | 2-propynyl-1-pyrrolidinecarbodithioate. | Dark amber oil. |
| (CH$_2$=CHCH$_2$)$_2$NCSSCH$_2$C≡CH | 2-propynyl diallyldithiocarbamate | Dark amber liquid. |
| (C$_2$H$_5$)$_2$NCSSCH$_2$CH:CH$_2$ | Allyl diethyldithiocarbamate | Amber liquid. |
| (C$_2$H$_5$)$_2$NCSSCH$_2$CH=CHCH$_2$SSCN(C$_2$H$_5$)$_2$ | 2-butene-1,4-dithiol bis(diethyldithiocarbamate). | Oil. |
| (CH$_2$=CHCH$_2$)$_2$NCSSCH$_2$CH=CHCH$_2$SSCN(CH$_2$CH=CH$_2$)$_2$ | 2-butene-1,4-dithiol bis(diallyldithiocarbamate). | Amber liquid. |
| [(CH$_3$)$_2$CH]$_2$NCSSCH$_2$CH=CHCH$_2$SCCN[CH(CH$_3$)$_2$]$_2$ | 2-butene-1,4-dithiol bis(diisopropyldithiocarbamate). | Yellow solid, M.P. 118–120° C. |
| (CH$_3$)$_2$CH\\NCSSCH$_2$CH:CH$_2$ / CNCH$_2$CH$_2$ | Allyl N-(β-cyanoethyl)-N-isopropyldithiocarbamate. | Pale yellow crystals, M.P. 65–67° C. |
| CH$_2$=CHCH$_2$\\NCSSCH$_2$CH=CH / (CH$_3$)$_2$CH | Allyl N-(allyl)isopropyldithiocarbamate. | Red Oil. |
| [(CH$_3$)$_2$CH]$_2$NCSSCH$_2$CH=CH$_2$ | Allyl diisopropyldithiocarbamate | Amber oil. |
| (CH$_2$=CHCH$_2$)$_2$NCSSCH$_2$CH=CH$_2$ | Allyl diallyldithiocarbamate | Amber liquid. |
| (C$_4$H$_9$)$_2$NCSSCH$_2$CH=CH$_2$ | Allyl dibutyldithiocarbamate | Do. |

Table VIII—Continued

| Structural formula | Compound | Physical Properties |
|---|---|---|
| CH₂=CHCH₂\\NCSSCH₂CH₂CN / (CH₃)₂CH | 2-cyanoethyl N-(allyl)isopropyldithiocarbamate. | Pale yellow oil. |
| [(CH₃)₂CH]₂NCSSCH₂C₆H₂Cl₃ | Trichlorobenzyl diisopropyldithiocarbamate. | Viscous dark brown liquid. |
| [(CH₃)₂CH]₂NCSSC₄H₉ | Butyl diisopropyldithiocarbamate | Amber oil. |
| [(CH₃)₂CH]₂NCSSCH₂CH₂CH₃ | Propyl diisopropyldithiocarbamate | Amber liquid. |
| [(CH₃)₂CH]₂NCSSCH(CH₃)₂ | Isopropyl diisopropyldithiocarbamate | Do. |
| [(CH₃)₂CH]₂NCSSC₂H₅ | Ethyl diisopropyldithiocarbamate | Do. |
| (C₂H₅)₂NCSSCH₃ | Methyl diethyldithiocarbamate | Do. |
| (C₂H₅)₂NCSSC₂H₅ | Ethyl diethyldithiocarbamate | Do. |
| [(CH₃)₂CH]₂NCSSCH₃ | Methyl diisopropyldithiocarbamate | Do. |
| NH₂CSSCH₂CCl=CHCl | Cis- and trans-2,3-dichloroallyl dithiocarbamate. | Yellow solid, M.P. 42–44° C. |
| CH₂=CHCH₂\\NCSSCH₂CCl=CHCl / (CH₃)₂CH | Cis- and trans-2,3-dichloroallyl N-(allyl)-isopropyldithiocarbamate. | Amber liquid. |

It is intended to cover all changes and modifications of the examples of the invention herein chosen for purposes of disclosure which do not constitute departures from the spirit and scope of the invention.

This application is a continuation-in-part of copending applications Serial No. 277,057, filed March 17, 1952, now U.S. Patent 2,744,898, and Serial No. 398,872, filed December 17, 1953, now abandoned.

What is claimed is:

1. The method of controlling vegetation which comprises applying thereto a toxic concentration of 2-chloroallyl diethyldithiocarbamate.

2. The method of controlling vegetation which comprises applying thereto a toxic concentration of allyl diisopropyldithiocarbamate.

3. The method of controlling vegetation which comprises applying thereto a toxic concentration of propyl diisopropyldithiocarbamate.

4. The method of controlling vegetation which comprises applying thereto a toxic concentration of butyl diisopropyldithiocarbamate.

5. The method of controlling vegetation which comprises applying thereto a toxic concentration of the 2,3-dichloroallyl esters of a dialkyl dithiocarbamic acid containing at least 2 but not more than 3 carbon atoms in each alkyl group.

6. The method of controlling vegetation which comprises applying thereto a toxic concentration of a phytotoxic ester of a dithiocarbamic acid possessing the structure

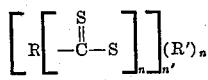

where R represents an amino radical selected from a group consisting of NH₂, lower alkyl—$\overset{H}{N}$ dialkylamino wherein the alkyl groups contain one to eight carbon atoms, di(2-chloroallyl)amino, (2-chloroallyl)lower alkylamino, (2-chloroally)lower alkoxy substituted lower alkylamino, (2-cyanoethyl)lower alkylamino, di(hydroxyethyl)amino, (allyl)lower alkylamino, diallylamino, N,N' - di - beta - cyanoethylethylenediamino, morpholinyl, pyrrolidinyl and di-lower alkyl substituted piperazinyl, the said amino radical being confined to a secondary amino radical containing at least four carbon atoms from the aforementioned group except where R' is halogen substituted, where R' represents the ester radical satisfying the valence of sulfur and is selected from a group consisting of lower alkyl, lower monoolefinic hydrocarbon, propynyl, halogen substituted monoolefinic hydrocarbon containing less than five carbon atoms, 3-chloro 2,4-hexadienyl and 2-cyanoethyl, n and n' represent integers of at least one but less than three wherein at least one of n and n' is one.

7. The method of claim 6 in which the phytotoxic ester is applied to the soil medium as a pre-emergent herbicide.

8. The method of controlling vegetation which comprises applying thereto a toxic concentration of a phytotoxic ester of a dithiocarbamic acid possessing the structure

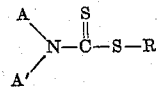

where A and A' represent allyl and R represents a halogen substituted monoolefinic hydrocarbon containing less than five carbon atoms.

9. The method of claim 8 in which the phytotoxic ester is applied to the soil medium as a pre-emergent herbicide.

10. The method of controlling vegetation which comprises applying thereto a toxic concentration of a phytotoxic ester of a dithiocarbamic acid possessing the structure

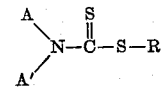

where A and A' represent alkyl groups containing less than five carbon atoms and R represents a halogen substituted monoolefinic hydrocarbon containing less than five carbon atoms.

11. The method of claim 10 in which the phytotoxic ester is applied to the soil medium as a pre-emergent herbicide.

12. The method of controlling vegetation which comprises applying thereto a toxic concentration of a phytotoxic ester of a dithiocarbamic acid possessing the structure

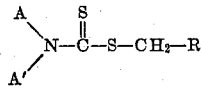

where A and A' represent allyl groups and R represents a halogen substituted vinyl group containing at least one but less than three halogen atoms.

13. The method of controlling vegetation which comprises applying thereto a toxic concentration of a phytotoxic ester of a dithiocarbamic acid possessing the structure

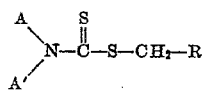

where A and A' represent alkyl groups containing less than five carbon toms and R represents halogen substituted vinyl containing at least one but less than three halogen atoms.

14. The method of controlling vegetation which comprises applying thereto a toxic concentration of allyl diallyldithiocarbamate.

15. The method of controlling vegetation which comprises applying thereto a toxic concentration of a phytotoxic ester of a dithiocarbamic acid possessing the structure

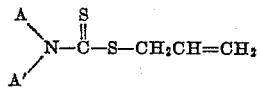

where A and A' represent alkyl radicals containing at least two but less than five carbon atoms.

16. The method of controlling vegetation which comprises applying thereto a toxic concentration of alkyl diisopropyldithiocarbamate wherein the alkyl group contains less than five carbon atoms.

17. The method of controlling vegetation which comprises applying thereto a toxic concentration of a phytotoxic ester of a dithiocarbamic acid possessing the structure

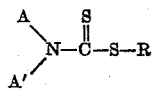

where A and A' represent alkyl radicals containing at least two but less than five carbon atoms and R represents lower alkyl.

References Cited in the file of this patent
UNITED STATES PATENTS

| | | |
|---|---|---|
| 1,924,566 | Orthner et al. | Aug. 29, 1933 |
| 1,972,961 | Tisdale et al. | Sept. 11, 1934 |
| 2,342,332 | Dean | Feb. 22, 1944 |
| 2,425,426 | Joyce | Aug. 12, 1947 |
| 2,430,332 | Guy | Nov. 4, 1947 |
| 2,535,877 | Stewart | Dec. 26, 1950 |
| 2,579,384 | Handy et al. | Dec. 18, 1951 |

FOREIGN PATENTS

| | | |
|---|---|---|
| 579,597 | Germany | June 28, 1933 |
| 858,352 | Germany | Dec. 4, 1952 |